(12) United States Patent
Hernández-Cisneros

(10) Patent No.: US 9,122,897 B2
(45) Date of Patent: Sep. 1, 2015

(54) METHOD FOR THE DETECTION AND CLASSIFICATION OF MICROCALCIFICATION CLUSTERS IN DIGITAL MAMMOGRAMS

(75) Inventor: Rolando-Rafael Hernández-Cisneros, Nuevo León (MX)

(73) Assignee: CAPIO TECHNOLOGIES S.A. DE C.V., Nuevo Leon (MX)

( * ) Notice: Subject to any disclaimer, the term of this patent is extended or adjusted under 35 U.S.C. 154(b) by 590 days.

(21) Appl. No.: 13/293,525

(22) Filed: Nov. 10, 2011

(65) Prior Publication Data

US 2012/0121159 A1 May 17, 2012

Related U.S. Application Data

(60) Provisional application No. 61/411,976, filed on Nov. 10, 2010.

(51) Int. Cl.
*G06K 9/00* (2006.01)

(52) U.S. Cl.
CPC ............ *G06K 9/00* (2013.01); *G06K 2209/053* (2013.01)

(58) Field of Classification Search
CPC ........................... G06K 2209/053; G06K 9/00

USPC .................................. 382/100, 128–132, 224
See application file for complete search history.

(56) References Cited

U.S. PATENT DOCUMENTS

| 7,483,919 | B2 * | 1/2009 | Galperin | 1/1 |
| 8,131,049 | B2 * | 3/2012 | Ruth et al. | 382/131 |
| 2001/0043729 | A1 * | 11/2001 | Giger et al. | 382/128 |
| 2011/0123073 | A1 * | 5/2011 | Gustafson | 382/128 |

* cited by examiner

*Primary Examiner* — Shefali Goradia
(74) *Attorney, Agent, or Firm* — Young & Thompson

(57) ABSTRACT

A method for the detection and classification of microcalcification clusters in digital mammograms which comprises the following steps: obtaining one or more digital mammograms; pre-processing the one or more digital mammograms by eliminating the noise from each one or more digital mammograms; detecting the points that are potential microcalcifications represented by their centroids, in the one or more pre-processed digital mammograms; identifying each mass center of potential microcalcifications as a microcalcification or non-microcalcification; identifying microcalcification clusters, using an algorithm for locating microcalcification cluster; and classifying each cluster into the classes benign or malignant.

8 Claims, 1 Drawing Sheet

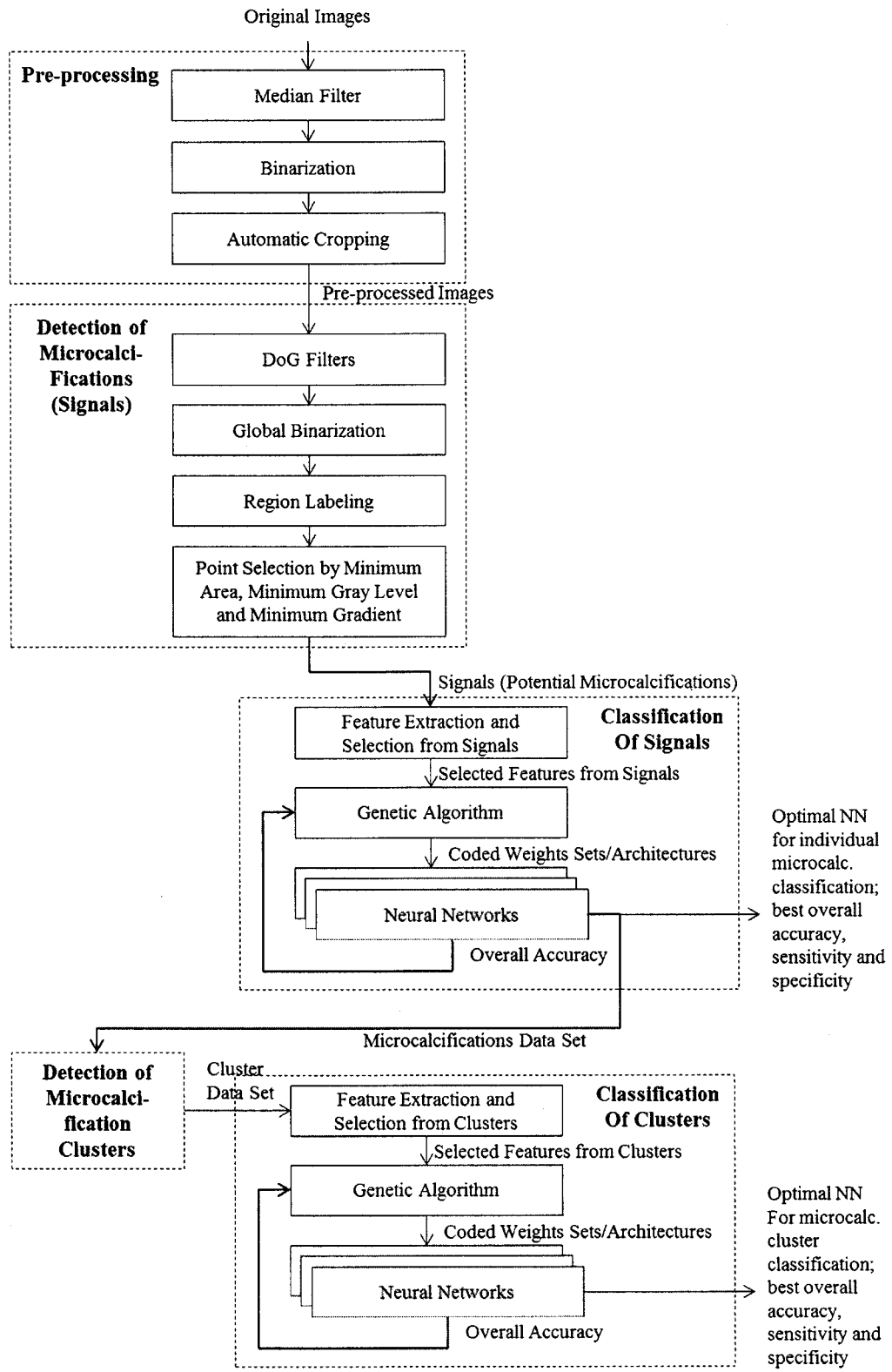

METHOD FOR THE DETECTION AND CLASSIFICATION OF MICROCALCIFICATION CLUSTERS IN DIGITAL MAMMOGRAMS

BACKGROUND OF THE INVENTION

A. Field of the Invention

The present invention is related to methods for the detection of breast cancer with screening mammography and more particularly to a method for the detection and classification of microcalcification clusters in digital mammograms that uses neural networks and genetic algorithms processed by a data processing system.

B. Description of the Related Art

Cancer is a term used to refer to a group of diseases where a group of cells of the body grow, change and multiply out of control. Usually, each type of cancer is named after the body part where it originated. When this erratic and uncontrolled proliferation of cells occurs in the breast tissues, it is known as breast cancer. Breast cancer is the fifth cause of death caused by cancer worldwide, after lung cancer, stomach cancer, liver cancer and colon cancer. During 2005, breast cancer caused approximately 502,000 deaths in the world. Among women, breast cancer is the type of cancer that causes the largest number or deaths worldwide, followed by lung, stomach, colorectal and cervical cancers The highest survival rates for breast cancer occur when it is detected in its earlier stages, when it usually appears in mammograms as very small specks of calcium known as microcalcifications. This survival rate decreases as cancer progresses undetected forming a mass or lump, called a tumor (extra tissue formed by rapidly dividing cells). Tumors can be either malignant (cancerous) or benign (non-cancerous). Breast malignant tumors penetrate and destroy healthy breast tissues. Eventually, a group of cells from a tumor may break away and spread to other parts of the body. These groups of cells spreading to another region are called metastases. Survival rates when breast cancer is discovered and begins to be treated in these advanced stages are low. There are several techniques for discovering breast cancer, which vary in their invasiveness, detection effectiveness and the breast cancer stage where they are more effective in. None of them provides absolute certainty about their predictions, so false positives (declared positive when no cancer is present) or false negatives (declared negative when cancer is present) results may occur, at different degrees of frequency. Breast self-examination (BSE) and clinical breast exam (CBE, performed by a trained medical or health professional) are the easiest procedures for detecting breast cancer, and they can detect lumps that are likely to be of cancerous origin. Nevertheless, if a detected lump is in fact malign, it means it has been developing for sometime, and certainly it is not in its initial stage. Other non-invasive methods that can detect breast cancer in early stages are mammography and breast ultrasonography.

Mammography is a special type of x-ray imaging used to create detailed images of the breast, and is the most widely used method for breast cancer detection in its early stages. Mammography can show changes in the breast well before a woman or her physician can feel them. Once a lump is discovered, mammography can be very useful in evaluating the lump to determine if it is cancerous. If a breast abnormality is found or confirmed with mammography, additional breast imaging tests such as ultrasound (sonography) or a breast biopsy may be performed. A biopsy is an invasive procedure, and it involves taking one or more samples of breast tissue and examining it under a microscope to determine whether it contains cancer cells or not. Usually, mammography or ultrasound, are used to help the radiologist or surgeon guide the needle to the correct area in the breast during biopsy. In resume, the main motivation of this work is the need to count with efficient tools that analyze the results of common techniques used in early detection of breast cancer (mainly mammograms) in order to support the work of expert radiologists and help them to provide more accurate and earlier results to patients, and therefore increasing their chances to survive.

Despite many advances in techniques for early breast cancer detection, mammography is still the main standard, especially in developing countries. Its low cost, and the fact that is not invasive, coupled with its high effectiveness make it a widely used technique. Nevertheless, a small percentage of cancer can be missed by mammography, and it is still important for women to have their breasts examined on a regular basis by a healthcare professional, and perform monthly breast self-exams. There are several findings that can be observed in a mammogram, like masses, cysts, architectural distortions, areas with asymmetric densities, and microcalcifications (tiny calcium deposits).

Microcalcifications are often signs of breast cancer in its earliest stages, especially when they appear forming clusters. It is a common practice for radiologists who diagnose early signs of breast cancer in mammograms to pay special attention in the detection of microcalcification clusters. However, the predictive value of mammograms is relatively low, compared to biopsy. This low sensitivity (correct diagnosis of positive cases) is caused by the low contrast between the cancerous tissue and the normal parenchymal tissue, the small size of microcalcifications and possible deficiencies in the image digitalization process. The sensitivity may be improved having each mammogram checked by two or more radiologists.

While a radiologist may miss some abnormalities in a case, another specialist may detect them. Despite the obvious benefit of double checking, it has the consequence of making the process inefficient from a practical viewpoint, because of the usually reduced number of mammography specialists in medical institutions (specially in developing countries) and by reducing the individual productivity of those specialists. The process of producing a mammogram may take between 20 to 30 minutes, and an initial diagnosis, usually takes about 40 minutes. Said time could increase if the suspicious abnormalities cannot be easily identified and confirmed as benign. A viable alternative is to replace one of the radiologists by a computer system, giving a second opinion. The system could emphasize suspicious abnormalities and show regions of interest for the specialists, and the results provided by the system could be confirmed or rejected by them.

In general, any computer system intended for the detection and diagnosis of individual microcalcifications and microcalcification clusters in mammograms should have some image processing functions that make possible the identification and isolation of individual microcalcifications and the posterior identification of microcalcification clusters. Such system should also include some classifying techniques for pre-diagnosing the detected microcalcification clusters into benign or malignant. Some previous works have used techniques like wavelets, fractal models, support vector machines, mathematical morphology, bayesian image analysis models, high order statistic, fuzzy logic, etc., in order to attempt the detection of real microcalcifications in the mammogram.

The present invention comprises a method for detecting microcalcification clusters in mammograms; and their classification into one of two classes: benign (usually the presence of tiny benign cysts) or malignant (possible presence of early breast cancer). This procedure is mainly based in difference of Gaussian (DoG) filters for the detection of suspicious objects in a mammogram, and artificial intelligence techniques combining genetic algorithms (GA) and evolutionary artificial neural networks (ANN) for the classification of such objects into microcalcifications or non-microcalcifications, and later for classifying the detected microcalcification clusters into benign or malignant.

DoG filters are adequate for the noise-invariant and size-specific detection of spots, like the points that appear in a DoG image. This DoG image represents the microcalcifications if a thresholding operation is applied to it. A procedure that applies a sequence of difference of Gaussian filters was developed, in order to maximize the amount of detected probable individual microcalcifications (signals) in the mammogram, which are later classified in order to detect if they are real microcalcifications or not. Finally, microcalcification clusters are identified and also classified to determine which ones are malignant and which ones are benign using several types of evolutionary neural networks.

SUMMARY OF THE INVENTION

It is therefore a main object of the present invention, to provide a method for the detection and classification of microcalcification clusters in digital mammograms which is based in difference of Gaussian (DoG) filters for the detection of suspicious objects in a mammogram, and artificial intelligence techniques combining genetic algorithms (GA) and evolutionary artificial neural networks (ANN) for the classification of such objects into microcalcifications or non-microcalcifications, and later for classifying the detected microcalcification clusters into benign or malignant.

It is also a main object of the present invention, to provide a method for the detection and classification of microcalcification clusters in digital mammograms of the above referred nature, in which a procedure that applies a sequence of difference of Gaussian filters is used in order to maximize the amount of detected probable individual microcalcifications (signals) in the mammogram, which are later classified in order to detect if they are real microcalcifications or not.

It is another object of the present invention to provide a method for the detection and classification of microcalcification clusters in digital mammograms of the above referred nature, in which microcalcification clusters are identified and also classified to determine which ones are malignant and which ones are benign using several types of evolutionary neural networks.

These and other objects and advantages of the method for the detection and classification of microcalcification clusters in digital mammograms of the present invention will become apparent to those persons having an ordinary skill in the art, from the following detailed description of the embodiments of the invention which will be made with reference to the accompanying drawings.

BRIEF DESCRIPTION OF THE DRAWINGS

FIG. 1 is a diagram of the method of the present invention including all of the steps of the method.

DETAILED DESCRIPTION OF THE INVENTION

The method for the detection and classification of microcalcification clusters in digital mammograms of the present invention will be described in accordance with a preferred embodiment thereof and making reference to the accompanying drawings.

The method for the detection and classification of microcalcification clusters in digital mammograms of the present invention is processed entirely on a data processing system that receives a digital mammogram as an input, and processes the following five steps that comprises the method of the present invention: pre-processing, detection of potential microcalcifications (signals), classification of signals into real microcalcifications, and detection of microcalcification clusters and classification of microcalcification clusters into benign and malignant. The diagram of the method of the present invention is shown in FIG. 1. As end-products of the method, there are obtained two artificial neural networks for classifying microcalcifications and microcalcifications clusters respectively, which are products of the evolutionary approaches that are described.

Step 1. Pre-Processing:

The main objective of the pre-processing step is to eliminate those elements in the image that could negatively affect the process of microcalcification detection and comprises the sub-steps of:

receiving the original images as input.

applying a median filter in order to eliminate the background noise, keeping intact the significant features of the images. A median filter is a non-linear filter frequently used to eliminate high frequency noise without deleting significant features of the image. A 3×3 mask is used, centering it in each pixel of the image, replacing the value of the central pixel with the median of the surrounding nine pixels covered by the mask. The size of this mask was chosen empirically, trying to avoid the loss of local details.

creating binary images from each filtered image. The purpose of the binary images is to help an automatic cropping procedure to delete the background marks and the isolated regions, so the image will contain only the region of interest.

applying a cropping procedure to the binary images, which eliminates isolated elements that are not connected with the group of pixels corresponding to the breast, and then makes adequate vertical and horizontal cuts based on the sums of pixels by rows and columns in the binary image in order to produce preprocessed smaller images, with less noise.

Step 2. Detection of Potential Microcalcifications (Signals):

The main objective of this step is to detect the mass centers of the potential microcalcifications in the pre-processed images from the previous step by:

using the optimized difference of two gaussian filters (DoG) for enhancing regions containing bright points in the pre-processed images;

globally binarizing the resultant images after applying a DoG filter, using an empirically determined threshold. In the resultant new image, regions of interest appear as isolated pixels surrounded by dark regions;

identifying each of the isolated pixels surrounded by dark regions by means of a region labeling algorithm;

extracting small 9×9 windows containing the regions of the image whose centroids correspond to the centroids of the points by means of a segmentation algorithm;

applying three selection methods to determine which points are potential microcalcifications (signals), the first method selects points according to the area of the region; the second method selects according to the gray mean level of the points and the third one according to the gray gradient. In order to facilitate the detection of signals, 15 DoG filters are applied sequentially, in such a way that the points discovered by each filter are added to the points previously found, eliminating the repeated ones. All of these points pass through the three selection procedures previously mentioned. The result is a list of signals represented by their centroids.

3. Classification of Potential Microcalcifications (Signals):

The objective of this stage is to identify if an obtained signal corresponds to an individual microcalcification or not by:

extracting a set of features from the signals, related to their contrast and shape. From each signal, 47 features are extracted, related to signal contrast, background contrast, shape features, contour sequence moments and some invariant geometric moments.

passing the whole set of features through two selection processes,—since there is no an a priori criterion for determine which features are the optimal features to be used for classifying—, the first process attempts to eliminate those features with high correlation with others, and the second process use a derivation of the forward sequential search algorithm. This algorithm decides what feature should be added based on the information gain provided by that specific feature. At the end, a feature subset that minimizes the classifier error is obtained.

classifying each signal by means of a three-layer feed-forward ANN (artificial neural network) in one of two classes: microcalcification and non-microcalcification. It is particularly difficult to classify signals into benign or malignant types, because this property is more related to groups of microcalcifications and not to individual microcalcifications. A traditional ANN and other three ANNs obtained from different evolutionary methods are used and compared for determining the most accurate classifier. These evolutionary approaches are:

Evolution of the ANN weight set.
Evolution of the initial weight set of an ANN, for a posterior gradient-based training.
Evolution of the architecture and basic parameters of an ANN, for a posterior gradient-based training.

4. Detection of Microcalcification Clusters:

In this stage, the microcalcification clusters are identified, using the microcalcifications detected in the previous stage by:

receiving the list of the microcalcifications as input;
producing a list of cluster features extracted and selected from each cluster using an algorithm for locating microcalcification cluster regions where the quantity of microcalcifications per cm2 (density) is higher. This algorithm keeps adding microcalcifications to their closest clusters at a reasonable distance until there are no more microcalcifications left or the remaining ones are too distant for being considered as part of a cluster. Every detected cluster is then labeled.

5. Classification of Microcalcification Clusters:

This stage has the objective of classifying each cluster into the classes benign or malignant by:

extracting a cluster feature set from every microcalcification cluster detected in the previous stage. The feature set is constituted by 30 features, related to cluster shapes, microcalcification areas and microcalcification contrasts; and determining the most accurate classifier using a conventional ANN and three ANNs obtained from the evolutionary methods previously mentioned are used and compared for. These evolutionary approaches are:

Evolution of the ANN weight set.
Evolution of the initial weight set of an ANN, for a posterior gradient-based training.
Evolution of the architecture and basic parameters of an ANN, for a posterior gradient-based training.

Finally it must be understood that the method for the detection and classification of microcalcification clusters in digital mammograms of the present invention, is not limited exclusively to the embodiments above described and illustrated and that the persons having ordinary skill in the art can, with the teaching provided by the invention, to make modifications to the method for the detection and classification of microcalcification clusters in digital mammograms of the present invention, which will clearly be within of the true inventive concept and of the scope of the invention which is claimed in the following claims.

What is claimed is:

1. A method for the detection and classification of microcalcification clusters in digital images, comprising the steps of:
    a) obtaining one or more digital images;
    b) pre-processing the one or more digital images by eliminating noise from each one or more digital images, to produce one or more preprocessed digital images having less noise;
    c) generating a list of points that are potential microcalcifications represented by their centroids, in the one or more pre-processed digital images;
    d) pre-classifying each point of potential microcalcification as a microcalcification or non-microcalcification to produce a list of classified points of potential microcalcifications;
    e) identifying microcalcification clusters from the list of classified points of potential microcalcification, using an algorithm for locating microcalcification clusters; and
    f) classifying each cluster into the classes benign or malignant.

2. The method according to claim 1, wherein the step b) comprises the sub-steps of:
    applying a median filter in order to eliminate background noise, keeping significant features of the preprocessed images intact, wherein a 3×3 mask is used, centering the mask on each pixel of the image, and replacing the value of the central pixel with the median of the surrounding nine pixels covered by the mask;
    creating binary images from each filtered image; and
    applying a cropping procedure to the binary images, which eliminates isolated elements that are not connected with the group of pixels corresponding to a breast, and then makes adequate vertical and horizontal cuts based on the sums of pixels by rows and columns in the binary image in order to produce smaller preprocessed images having less noise.

3. The method according to claim 1, wherein the step c) comprises the sub-steps of:
    using the optimized difference of two gaussian filters (DoG) for enhancing regions containing bright points in the pre-processed images;
    globally binarizing the resultant images after applying a DoG filter, using an empirically determined threshold, wherein regions of interest appear as isolated pixels surrounded by dark regions;
    identifying each of the isolated pixels surrounded by dark regions using a region labeling algorithm;
    extracting small 9×9 windows containing regions of the image whose centroids correspond to the centroids of the points of potential microcalcification, using a segmentation algorithm; and
    applying three selection methods to determine which points are potential microcalcifications:
        a first method selects points according to the area of the region;

a second method selects points according to the gray mean level of the points; and a third method selects points according to the gray gradient;

wherein to facilitate detection of signals, fifteen DoG filters are applied sequentially in such a way that the points discovered by each filter are added to the points previously found, eliminating the repeated ones, all of these points passing through the three selection methods, resulting in the list of points that are potential microcalcifications represented by their centroids.

4. The method according to claim 1, wherein the step d) comprises the sub-steps of:

extracting a set of features from the points that are potential microcalcifications represented by their centroids, wherein said features are related to signal contrast, background contrast, shape features, contour sequence moments, and invariant geometric moments;

passing the set of features through two selection processes, wherein a first process attempts to eliminate those features having high correlation with others, and a second process uses a derivation of a forward sequential search algorithm that decides what feature should be added, based on information gain provided by that specific feature, to obtain a feature subset that minimizes the classifier error; and classifying each set of features from the points that are potential microcalcifications, using a three-layer feedforward artificial neural network, into one of two classes: microcalcification and non-microcalcification.

5. The method according to claim 4, wherein the artificial neural network is obtained from the following evolutionary methods:

evolution of the artificial neural network weight set;

evolution of the initial weight set of an artificial neural network, for a posterior gradient-based training; and evolution of the architecture and basic parameters of an artificial neural network, for a posterior gradient-based training.

6. The method according to claim 1, wherein the step e) comprises the sub-steps of:

receiving the list of classified points of potential microcalcifications as input; and producing a list of cluster features extracted and selected from each cluster using an algorithm for locating microcalcification cluster regions where the quantity of microcalcifications per $cm^2$ (density) is high, wherein said algorithm keeps adding microcalcifications to their closest clusters until there are no more microcalcifications remaining or the remaining microcalcifications are too distant to be considered as part of a cluster.

7. The method according to claim 1, wherein the step f) comprises the sub-steps of:

extracting a cluster feature set from the microcalcification clusters detected in the step e), the feature set comprising features related to cluster shapes, microcalcification areas, and microcalcification contrasts; and determining the most accurate classifier for classifying each cluster using a conventional artificial neural network and three other artificial neural networks obtained from different evolutionary methods.

8. The method according to claim 7, wherein the three artificial neural networks are obtained from the following evolutionary methods:

evolution of the artificial neural network weight set;

evolution of the initial weight set of an artificial neural network, for a posterior gradient-based training; and evolution of the architecture and basic parameters of an artificial neural network, for a posterior gradient-based training.

* * * * *